United States Patent
Karabinis

(10) Patent No.: US 8,594,704 B2
(45) Date of Patent: Nov. 26, 2013

(54) LOCATION-BASED BROADCAST MESSAGING FOR RADIOTERMINAL USERS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 2245 days.

(21) Appl. No.: 11/291,192

(22) Filed: Dec. 1, 2005

(65) Prior Publication Data

US 2006/0135058 A1  Jun. 22, 2006

Related U.S. Application Data

(60) Provisional application No. 60/636,594, filed on Dec. 16, 2004.

(51) Int. Cl.
*H04W 24/00* (2009.01)
(52) U.S. Cl.
USPC ............... 455/456.3; 455/414.2; 455/456.1; 455/457; 455/412.2; 725/39
(58) Field of Classification Search
USPC ............ 455/456, 456.1, 456.3, 457, 412.2, 455/414.2
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,418,537 A | 5/1995 | Bird | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

Beongku et al. "A Cellular Architecture for Supporting Geocast Services", Vehicle Technology Conference, Sep. 24-28, 2000, Piscataway, NJ, USA, IEEE; vol. 3, p. 1452-1459.*

(Continued)

*Primary Examiner* — Patrick Edouard
*Assistant Examiner* — Chuck Huynh
(74) *Attorney, Agent, or Firm* — Myers Bigel Sibley & Sajovec, P.A.

(57) ABSTRACT

Methods, radioterminals, and broadcast message generation consoles provide location-based broadcast messaging for users. A method of operating a radioterminal can include receiving at the radioterminal over a wireless air interface a broadcast message that includes region information that defines a geographic region of applicability. A determination is made at the radioterminal whether the radioterminal is located in the region of applicability. A functional mode of the radioterminal is activated in response to the radioterminal being in the region of applicability. The functional mode may include activating a user interface of the radioterminal.

33 Claims, 4 Drawing Sheets

(56) References Cited

U.S. PATENT DOCUMENTS

| | | |
|---|---|---|
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,177,873 B1 | 1/2001 | Cragun |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,608,559 B1 | 8/2003 | Lemelson et al. |
| 6,628,919 B1 | 9/2003 | Curello et al. |
| 6,684,057 B2 | 1/2004 | Karabinis |
| 6,721,572 B1 | 4/2004 | Smith et al. |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,785,551 B1* | 8/2004 | Richard .................. 455/456.1 |
| 6,810,527 B1 | 10/2004 | Conrad et al. |
| 6,856,787 B2 | 2/2005 | Karabinis |
| 6,859,652 B2 | 2/2005 | Karabinis et al. |
| 6,879,829 B2 | 4/2005 | Dutta et al. |
| 6,882,837 B2 | 4/2005 | Fernandez et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,035,647 B2* | 4/2006 | de Verteuil ............ 455/456.1 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0143974 A1* | 7/2003 | Navarro ................... 455/404 |
| 2003/0149986 A1 | 8/2003 | Mayfield et al. |
| 2003/0153308 A1 | 8/2003 | Karabinis |
| 2003/0194995 A1 | 10/2003 | Handerson et al. |
| 2004/0072539 A1 | 4/2004 | Monte et al. |
| 2004/0080454 A1* | 4/2004 | Camp, Jr. ................ 342/464 |
| 2004/0102156 A1 | 5/2004 | Loner |
| 2004/0103158 A1 | 5/2004 | Vella et al. |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0193617 A1 | 9/2004 | Adler |
| 2004/0203393 A1 | 10/2004 | Chen |
| 2004/0203562 A1 | 10/2004 | Kolsrud |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0070247 A1 | 3/2005 | Larson et al. |
| 2005/0079816 A1 | 4/2005 | Singh et al. |
| 2005/0090256 A1 | 4/2005 | Dutta |
| 2005/0093717 A1 | 5/2005 | Lilja |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239436 A1 | 10/2005 | Bell et al. |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0014547 A1 | 1/2006 | Walter |
| 2006/0040659 A1 | 2/2006 | Karabinis |

FOREIGN PATENT DOCUMENTS

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 253 542 A2 | 10/2002 |
| GB | 2 397 196 A | 7/2004 |
| GB | 2397196 A * | 7/2004 |
| WO | WO 01/54314 A1 | 7/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

(56) References Cited

OTHER PUBLICATIONS

Global.com, "Globalstar Demonstrates World's First Prototype of Terrestrial System to Supplemental Satellite Phones," http://www.alobalcomsatphone.com/globalcom/globalstar_terrestrial_system.html, Jul. 18, 2002, 2 pages.

An, et al. "A Cellular Architecture for Supporting Geocast Services" *Vehicular Technology Conference, IEEE VTS Fall VTC* 24-28 (2000).

International Search Report for PCT/US2005/044216 Date of mailing Jun. 28, 2006.

* cited by examiner

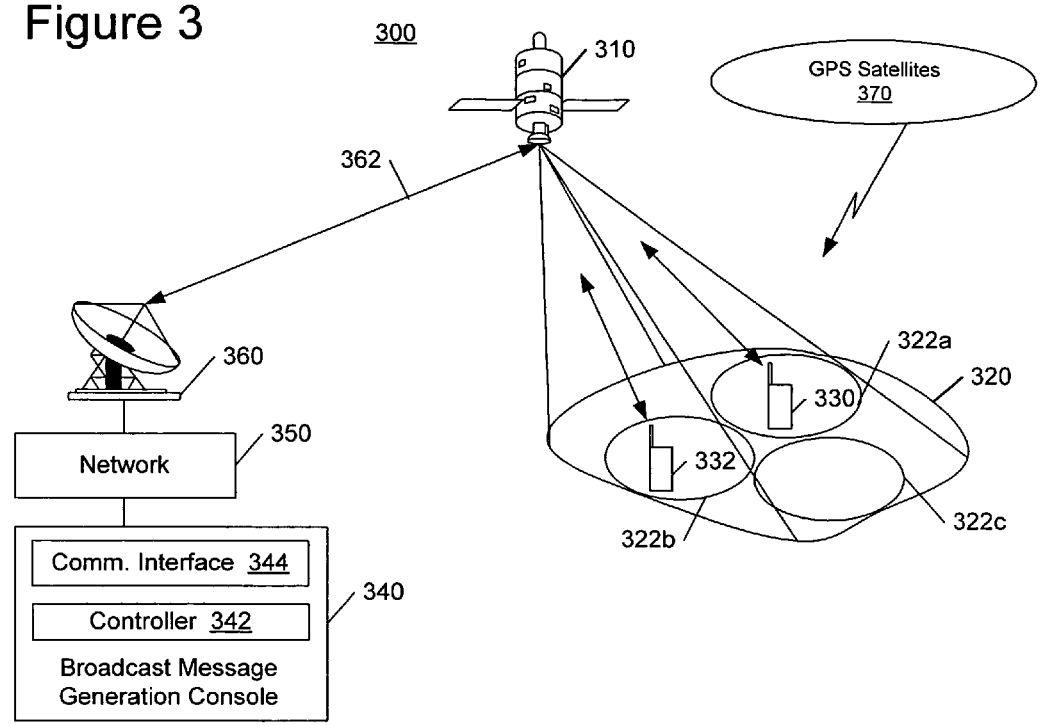
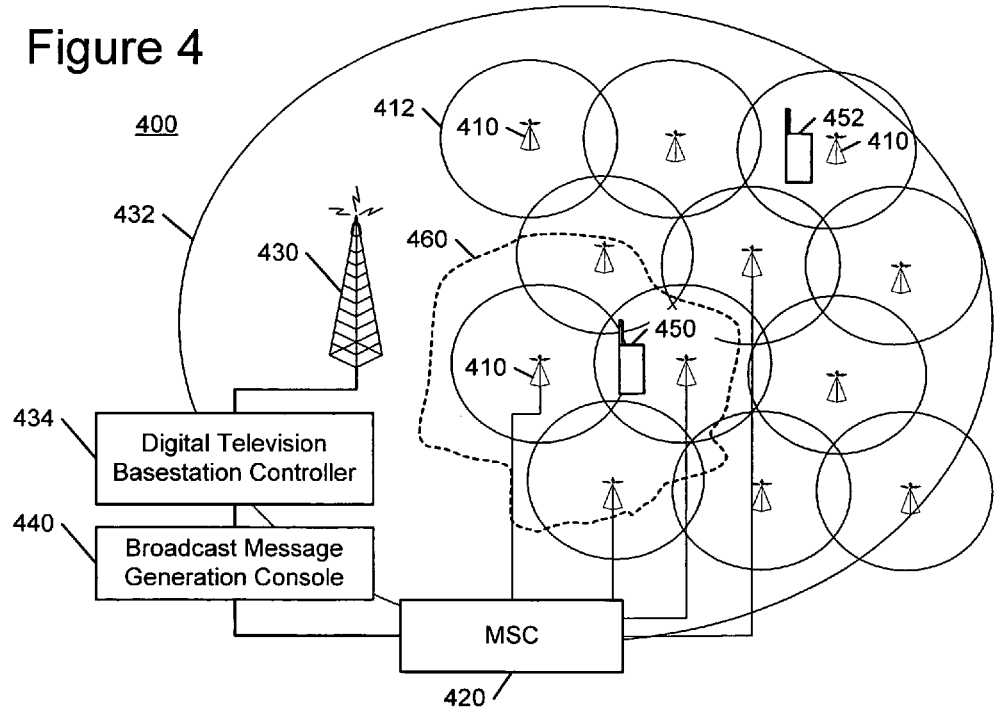

LOCATION-BASED BROADCAST MESSAGING FOR RADIOTERMINAL USERS

RELATED APPLICATION

The present application claims the benefit of U.S. Provisional Application Ser. No. 60/636,594, filed Dec. 16, 2004 and hereby incorporated by reference herein in its entirety.

FIELD OF THE INVENTION

This invention relates to wireless communications systems and methods, and more particularly to satellite and terrestrial communications systems and methods.

BACKGROUND OF THE INVENTION

Wireless communications systems and methods are widely used to communicate wirelessly with users of radioterminals. As is well known to those having skill in the art, wireless communication systems and methods include conventional terrestrial cellular communication systems and methods, satellite communication systems and methods, ancillary terrestrial communication systems and methods that use one or more satellite communication frequencies terrestrially, and combinations of these and/or other systems and methods.

It is becoming increasingly common for radioterminals to be configured to determine their geographic location. One widely used location determination system and method is the Global Positioning System (GPS). As is well known to those having skill in the art, GPS is a satellite navigation system that is funded and controlled by the U.S. Department of Defense, that provides specially coded satellite signals that can be processed in a GPS receiver, enabling the receiver to compute position, velocity and/or time. As used herein, the term "GPS" also includes other systems that can be used to measure locations on the earth, such as GLONASS. Some cellular communication systems are also configured to assist a radioterminal in determining its geographic location.

Cellular communications systems, satellite communications systems, and ancillary terrestrial communications systems may utilize multiple antenna patterns (beams or cells) each of which can serve a substantially distinct geographical area in an overall service region. Because radioterminals typically are mobile and move through many different service areas of a communication system, a centralized database may be used to track the location of radioterminals within the service region. Upon registering with a system, an initial service area of a radioterminal is entered into the database. As the radioterminal moves from area to area, the database is updated to reflect the radioterminal's present location. The database can then be queried to determine which cell and associated base station transceiver and/or satellite beam within the communication system needs to be used to contact the radioterminal.

As used herein, the term "radioterminal" includes cellular communications radiotelephones, satellite communications radiotelephones, and/or ancillary terrestrial communications radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other devices, which include a radio frequency transceiver. A radioterminal also may be referred to herein as a "radiotelephone", a "wireless terminal" or simply as a "terminal". As used herein, the term(s) "radiotelephone", "radioterminal", "wireless terminal" and/or "terminal" also include(s) any other radiating user device/equipment/source that can have time-varying geographic coordinates by, for example, being portable, transportable, and/or installed in a vehicle (e.g., aeronautical, maritime, or land-based).

SUMMARY OF THE INVENTION

Some embodiments of the present invention provide methods of operating a radioterminal. A broadcast message is received at the radioterminal over a wireless air interface. The broadcast message includes region information that defines a geographic region of applicability. A determination is made at the radioterminal as to whether the radioterminal is located in the region of applicability. A functional mode of the radioterminal is activated in response to the radioterminal being in the region of applicability.

In some further embodiments of the present invention, activation of the functional mode may include activation of a user interface of the radioterminal. For example, first payload information defined by the broadcast message may be displayed on a display device of the radioterminal in response to the radioterminal being in the region of applicability. Second payload information, defined by the broadcast message, which may be different than the first payload information, may be displayed on the display device of the radioterminal in response to the radioterminal being outside the region of applicability. A first audible announcement may be generated by the radioterminal based on the broadcast message and in response to the radioterminal being in the region of applicability, and a second audible announcement, which may be different than the first audible announcement, may be generated by the radioterminal based on the broadcast message and in response to the radioterminal being outside the region of applicability.

In some further embodiments of the present invention, the geographic location of the radioterminal may be determined based on received global positioning system signals, based on range estimates derived from cellular communication signals received from and/or transmitted to a plurality of cellular base stations having known geographic locations, based on range estimates derived from digital television signals received at the radioterminal from a plurality of digital television base station transceivers having known geographic locations, and/or using other techniques.

In some further embodiments of the present invention, the received broadcast message may include a group address that defines a group of radioterminals for which the broadcast message is applicable. The radioterminal may determine whether it is a member of the group of radioterminals defined by the group address for which the broadcast message is applicable. The radioterminal may then activate the functional mode in response to the radioterminal being in the region of applicability and being a member of the group of radioterminals for which the broadcast message is applicable.

In some further embodiments of the present invention, the radioterminal may partially decode the broadcast message to obtain the region of applicability. The radioterminal may then further decode the broadcast message to obtain payload information defined by the broadcast message responsive to the radioterminal being in the region of applicability.

In some further embodiments of the present invention, at least a portion of the received broadcast message may be selectively stored in a non-volatile memory within the radioterminal responsive to the determination of whether the radioterminal is located within the region of applicability. For example, payload information from the received broadcast message may be displayed on a display device of the radioterminal and/or used to generate an audible announcement in response to the radioterminal being in the region of applicability. However, when the radioterminal is outside the region of applicability, it may store at least a portion of the payload information and associated region of applicability in a non-volatile memory within the radioterminal. The stored payload information may be retrieved from the non-volatile memory in response to the radioterminal becoming within the region of applicability and may be displayed on the display device and/or used to generate an audible announcement.

In some other embodiments of the present invention, a radioterminal includes a user interface, a wireless transceiver, a location determination unit, and a controller. The user interface is configured to communicate information to a user of the radioterminal. The wireless transceiver is configured to receive over a wireless air interface a broadcast message that includes region information that defines a geographic region of applicability. The location determination unit is configured to determine a geographic location of the radioterminal. The controller is configured to determine whether the radioterminal is located in the region of applicability based on the region information from the broadcast message and the determined location of the radioterminal, and to activate a functional mode of the radioterminal in response to being in the region of applicability.

In some other embodiments of the present invention, a broadcast message generation console includes a communications interface communicatively coupled to a base station radio-transmitter and a controller. The controller is configured to generate a broadcast message that includes payload information and region information that defines a geographic region of applicability for the payload information and to communicate the broadcast message through the communications interface for broadcast by the base station radio-transmitter to a geographic region that includes the geographic region of applicability.

BRIEF DESCRIPTION OF THE DRAWINGS

FIG. 3 is a block diagram that illustrates a satellite communication system that generates a broadcast message according to some embodiments of the present invention.

FIG. 4 is a block diagram that illustrates a terrestrial communications system that generates a broadcast message according to some embodiments of the present invention.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Figure 1:
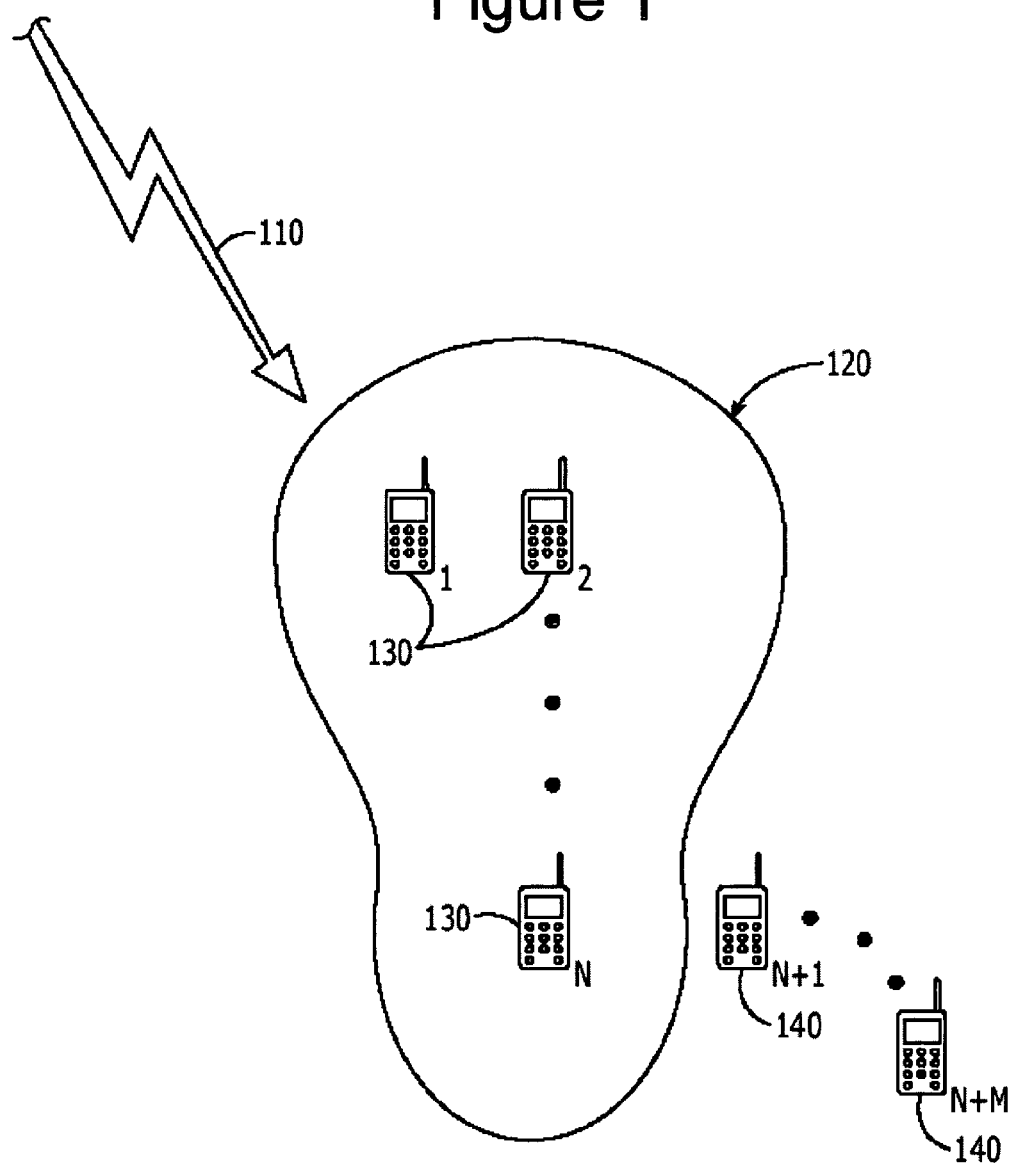
FIG. 1 is a schematic diagram that illustrates a plurality of radioterminals that can receive a broadcast message that defines a region of applicability according to some embodiments of the present invention, and where some of the illustrated radioterminals are within and some are outside the region of applicability.

Embodiments of the present invention can provide location-based broadcast messaging for radioterminal users. In particular, as shown in FIG. 1, a broadcast message 110 may be broadcast by a satellite, terrestrial cellular, ancillary terrestrial, and/or digital television system over one or more cells, service regions, and/or spot beams thereof. The broadcast message 110 comprises region information that defines a geographic region 120 of applicability for the broadcast message 110. The broadcast message 110 may define the geographic region of applicability by, for example, providing geographic coordinates that indicate a boundary of the region, a center of the region and its radius, and/or based on other techniques that can define a region.

One or more first radioterminals 130, also labeled 1–N in FIG. 1, are located within the region 120. One or more second radioterminals 140, also labeled N+1–N+M in FIG. 1, are located outside the region 120. The first and second radioterminals may be substantially identical or different.

Figure 2:
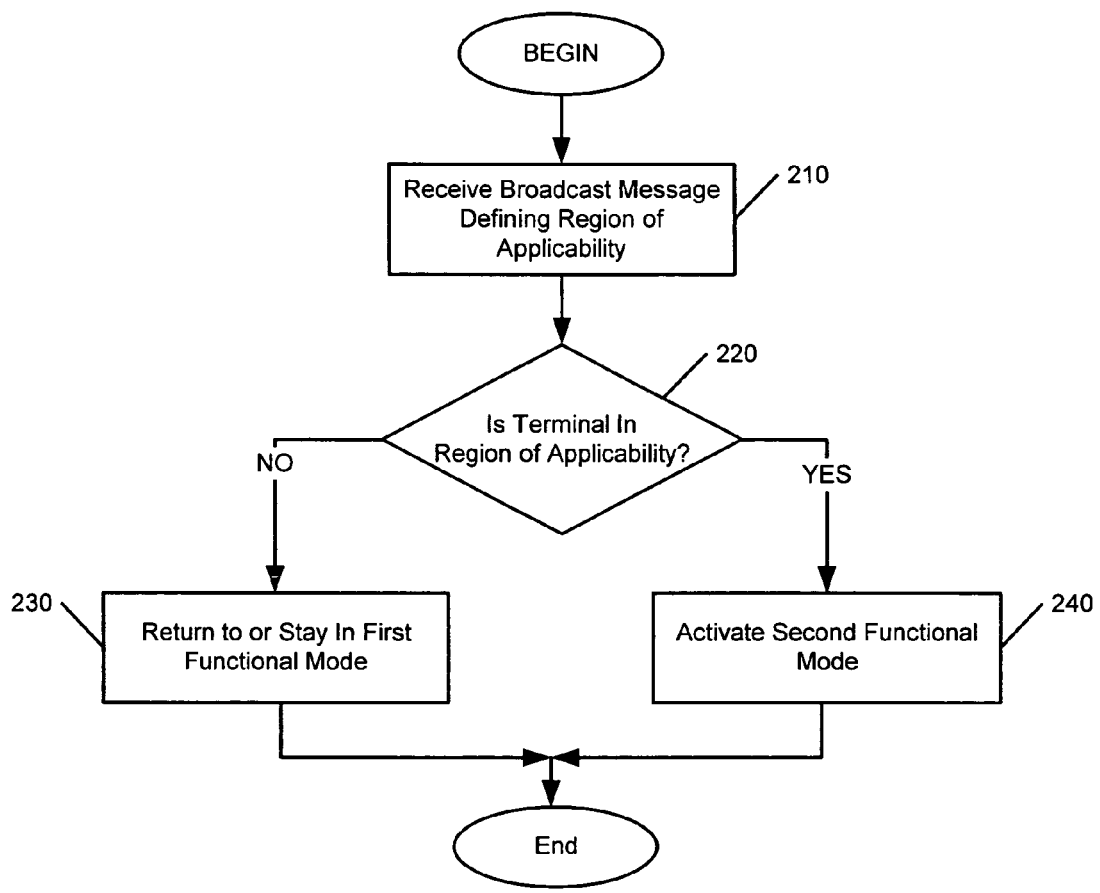
FIG. 2 is a flowchart of operations that can selectively activate a functional mode of a radioterminal when the radioterminal is in the region of applicability according to some embodiments of the present invention.

FIG. 2 is a flowchart of methods and operations that may be performed by radioterminals, such as radioterminals 130 and/or 140 of FIG. 1, according to various embodiments of the present invention. As shown in FIG. 2, at Block 210, the radioterminals 130 and/or 140 receive a broadcast message, such as the broadcast message 110 of FIG. 1, which includes region information that defines a geographic region of applicability, such as the region 120 of FIG. 1. Each of the radioterminals 130 and/or 140 can determine from its geographic location whether it is located in the region of applicability 120 for the broadcast message. As will be described below, the radioterminals 130 and/or 140 may determine their location based on, for example, processing of GPS signals and/or they may determine their location, or be informed of their location as determined by another device, based on triangulation of cellular, ancillary cellular, and/or digital television communication signals. The radioterminals 130,140 each determine at Block 220 whether they are within or outside of the region of applicability 120.

In response to the radioterminals 140 determining at Block 220 that they are outside the region of applicability 120, they may each remain-in, return-to, or activate a first functional mode of the respective terminals. Thus, for example, the radioterminals 140 may ignore the broadcast message by remaining in or returning to the same function mode as before the broadcast message was received.

In contrast, in response to the radioterminals 130 determining at Block 220 that they are in the region of applicability 120, they may each activate a second functional mode of the respective terminals. In some embodiments, the second functional mode is associated with a user interface of the radioterminals 130,140. Accordingly, the radioterminals 130 may activate a user interface in response to determining at Block 220 that they are in the region of applicability 120.

For example, referring again to FIG. 1, upon occurrence of an event, it may be desirable to summon first responders to a particular location. A broadcast message 110 may be broadcast by a satellite, terrestrial cellular, ancillary terrestrial, and/or digital television system over one or more cells, spot beams, and/or service areas thereof, asking users of radioterminals 130 that are located within the specified region 120 to respond or gather in a particular location.

In response to the determination by one of the radioterminals 130 that it is within the region 120, it may activate a second functional mode that displays a message on its display device, generates an audible announcement (such as a voice message and/or ring tone), generates a vibration that can be sensed by a user, and/or that generates another alert to inform a user thereof to report to a particular location or to otherwise respond to the event. The radioterminals 140 outside the region 120 may not activate the second functional mode and, thereby, not alert a user thereof to the broadcast message.

In some other embodiments, the first and second functional modes may both be associated with a user interface of the radioterminals 130,140. For example, users of the radioterminals 130 within the region 120 may receive a different alert than users of the radioterminals 140 outside the region 120. The radioterminals 140 may activate a first functional mode at Block 230 to generate a first alert and the radioterminals 130 may activate a different second functional mode at Block 240 to generate a different second alert. Thus, referring back to FIG. 2, the first functional mode carried out at Block 230 may display first payload information defined by the broadcast message on a display device of the radioterminals 140. The second functional mode carried out at Block 240 may display second payload information defined by the broadcast message, which is different than the first payload information, on a display device of the radioterminals 130. Further to the example above, a message may be displayed to users of radioterminals 130 that instructs them to respond or gather in a particular location, while another message may be displayed to users of radioterminals 140 that informs them of the event and instructs them to be prepared to respond if further assistance is needed.

In some other embodiments, the radioterminals 130,140 can generate different audible announcements based on different payload information of the broadcast message and in response to whether they are within or outside of the region of applicability 120. In yet some other embodiments, the radioterminals 130,140 can generate different ring tones and/or vibrations having characteristics that differ in response to whether they are within or outside of the region of applicability 120.

Accordingly, a radioterminal may selectively alert a user to a broadcast message based on whether the radioterminal determines to be in the defined region of applicability for the message, or it may selectively generate different alerts responsive to that determination.

FIG. 3 illustrates a satellite communication system 300 that generates a broadcast message in accordance with some embodiments of the present invention. The system 300 includes a satellite 310 that serves a service region 320, here shown as including a plurality of cells (service link antenna patterns) 322a-c. Two radioterminals 330, 332 are shown in adjacent cells 322a, 322b, respectively. The radioterminals 330, 332 are configured to receive broadcast messages from the satellite 310, and may be further configured to transmit messages thereto.

A broadcast message generation console 340 includes a controller 342 that is configured to generate a broadcast message that includes payload information and region information that defines a geographic region of applicability for the payload information. In some embodiments, the region information may be encoded within a header portion of the broadcast message. The controller 342 communicates the broadcast message through the communications interface 344 and a network 350 to a satellite base station transceiver 360. The satellite transceiver 360 communicates the broadcast message through a communications link 362 to the satellite 310 where it is broadcast across the service region 320 or across a portion of the service region 320. By way of example, the region of applicability can be defined to correspond to cell 322a. The radioterminals 330, 332 may each determine a measure of their location based on processing signals from GPS satellites 370 and/or based on other techniques. Radioterminal 330 generates an alert to a user in response to it receiving the broadcast message and determining that it is located in the defined region of applicability 322a. In contrast, radioterminal 332 may receive the broadcast message and may not generate an alert, or may generate a different alert than radioterminal 330 in response to it determining that it is not located in the region 322a.

In some embodiments, the broadcast message console 340 may generate the broadcast message responsive to an operator in an emergency response center and/or responsive to a message received from another communications device via, for example, a wireline network (e.g., Internet and/or private network) and/or a wireless network (e.g., cellular and/or satellite network). As will be appreciated, because the radioterminals 330, 332 vary their functional response to a broadcast message based upon their own determination of whether they are within the region of applicability, it may obviate a need to perform centralized tracking of radioterminal locations and generating messages based on such centralized tracking.

The broadcast message console 340 may further generate in the broadcast message a group address that defines a group of radioterminals for which the broadcast message is applicable. Each of the radioterminals 330, 332 may be configured to determine whether they are members of the group of radioterminals defined by the group address of the broadcast message. Radioterminal 330 can then selectively activate one or more functional modes therein in response to it being in the region of applicability 322a and being a member of the applicable group of radioterminals. Thus, for example, the broadcast message may be used to alert selected public officials (e.g., policemen, firemen, public electrical repairmen, or public waterline repairmen) within the region of applicability to respond to an event.

FIG. 4 illustrates a terrestrial communications system 400 that generates a broadcast message in accordance with some embodiments of the present invention. The system 400 includes a cellular communications system and a digital television communications system. The cellular communications system includes a plurality of cellular base station transceivers 410, each of which services at least one cell 412, and a mobile switching center (MSC) 420. The base station transceivers 410 may additionally or alternatively form an ancillary terrestrial communications system that uses one or more satellite communications frequencies terrestrially to communicate with radioterminals in the cells 412. The digital television communications system includes a digital television base station transceiver 430, which services a region 432, and a digital television base station controller 434.

Although the cells 322 and 412 and region 432 have been drawn as circles/ovals of uniform size for ease of illustration, it is to be understood that their shape and size will vary based upon, for example, antenna transmission patterns and obstructions (e.g., mountains, valleys, buildings). The digital television base station transceiver 430 generally would be centrally located within the service region 432, but for ease of illustration it has been shown offset therefrom.

A broadcast message generation console 440, which may be configured as shown in FIG. 3, generates a broadcast message which it may communicate to the digital television base station controller 434 and/or the MSC 420. The broadcast message includes payload information and region information that defines a geographic region of applicability for the payload information. The MSC 420 communicates the broadcast message to at least some of the cellular base station transceivers 410 which broadcast it across their respective cells 412. The digital television base station controller 434 communicates the broadcast message to the digital television base station transceiver 430 which broadcasts it across the region 400.

Two radioterminals 450, 452 are shown in two different cells 412. The radioterminals 450, 452 are configured to receive broadcast messages from the cellular base station transceivers 410 and/or the digital television base station transceiver 430. For purposes of discussion, an exemplary broadcast message generated by the broadcast message generation console 440 defines a region of applicability 460 that encompasses a plurality of the cells 412, including the radioterminal 450. As shown, radioterminal 452 is outside the region of applicability 460. Both radioterminals 450, 452 receive the broadcast message via the cellular base station transceivers 410 and/or the digital television base station transceiver 430.

The radioterminals 450, 452 may each determine their location based on GPS signal processing and/or range estimates derived from cellular communication signals communicated between the radioterminals 450, 452 and a plurality of the cellular base station transceivers 410. For example, the radioterminals 450, 452 may triangulate their geographic location based on the range estimates and known geographic locations of the ranged cellular base station transceivers 410.

A plurality of the cellular base station transceivers 410 may determine the range of the radioterminals 450, 452 therefrom based on time of flight of the radioterminal communications signals, and may determine the geographic location of the radioterminals 450, 452 based thereon. Corresponding ones of the cellular base station transceivers 410 may then communicate to the radioterminals 450, 452 their determined geographic locations. Alternatively or additionally, the radioterminals 450, 452 may each determine their location based on range estimates derived from digital television signals received from a plurality of the digital television base station transceivers 430 that have overlapping service regions and have known geographic locations.

Radioterminal 450 generates an alert to a user in response to receiving the broadcast message and determining that it is located in the defined region of applicability 460. In contrast, radioterminal 452 receives the broadcast message and may not generate an alert or may generate a different alert than radioterminal 450 in response to determining that it is not located in the region 460. The radioterminal 450 may continue to monitor its geographic location and may cease generation of the alert (e.g., stop displaying the alert message) and/or change the alert (e.g., display a different alert message) when it determines that it is no longer within the region 460. Similarly, the radioterminal 452 may continue to monitor its geographic location and may initiate the generation of an alert when it determines that it has become within the region 460.

The broadcast message may define more than one region of applicability. The radioterminals 450, 452 can include a plurality of different functional modes, and can selectively activate different ones of the functional modes in response to which, if any, of the regions of applicability it is determined to be within.

By way of example, a television station may want to issue a general weather alert, such as a tornado watch, for region 432 and a more particular alert, such a tornado warning, for region 460. The television station may generate a broadcast message through the console 440 that defines two regions of applicability 432, 460 and includes different voice data and/or textual data associated with the different regions 432, 460 as a payload of the broadcast message. The broadcast message is transmitted through the digital television base station transceiver 430 across service region 432 and/or through at least some of the cellular base station transceivers 410 across the cells 412. Radioterminal 450 generates an audible announcement, displays a message, generates a vibration pattern, and/or a ring tone to notify a user of the weather alert. For example, a user of radioterminal 450 may be warned, through displayed text and/or audible announcement, to seek immediate shelter from a tornado. The broadcast message may also cause the other radioterminal 452 to ignore the message or to generate a different audible announcement, displayed message, vibration pattern, and/or ring tone than that generated by the radioterminal 450. For example, a user of radioterminal 452 may be informed of the tornado region and warned to keep a lookout for further weather alerts until a defined time.

When the region of applicability changes over time, such as due to movement of a weather pattern, subsequent broadcast messages may define differing regions of applicability. The radioterminals 450, 452 may thereby activate/inactivate various functionalities responsive to the time varying regions defined in the messages so as to cease, change, or initiate notification of users.

Although the broadcast messages may include discrete data blocks, the invention is not limited thereto. For example, the broadcast message generation console 440 may be configured to generate a continuous message data stream that includes broadcast messages therein. The region information that defines the region of applicability may be encoded within multiple locations (e.g., repetitively occurring locations) in the broadcast message data stream and payload information may be encoded therebetween.

Figure 5:
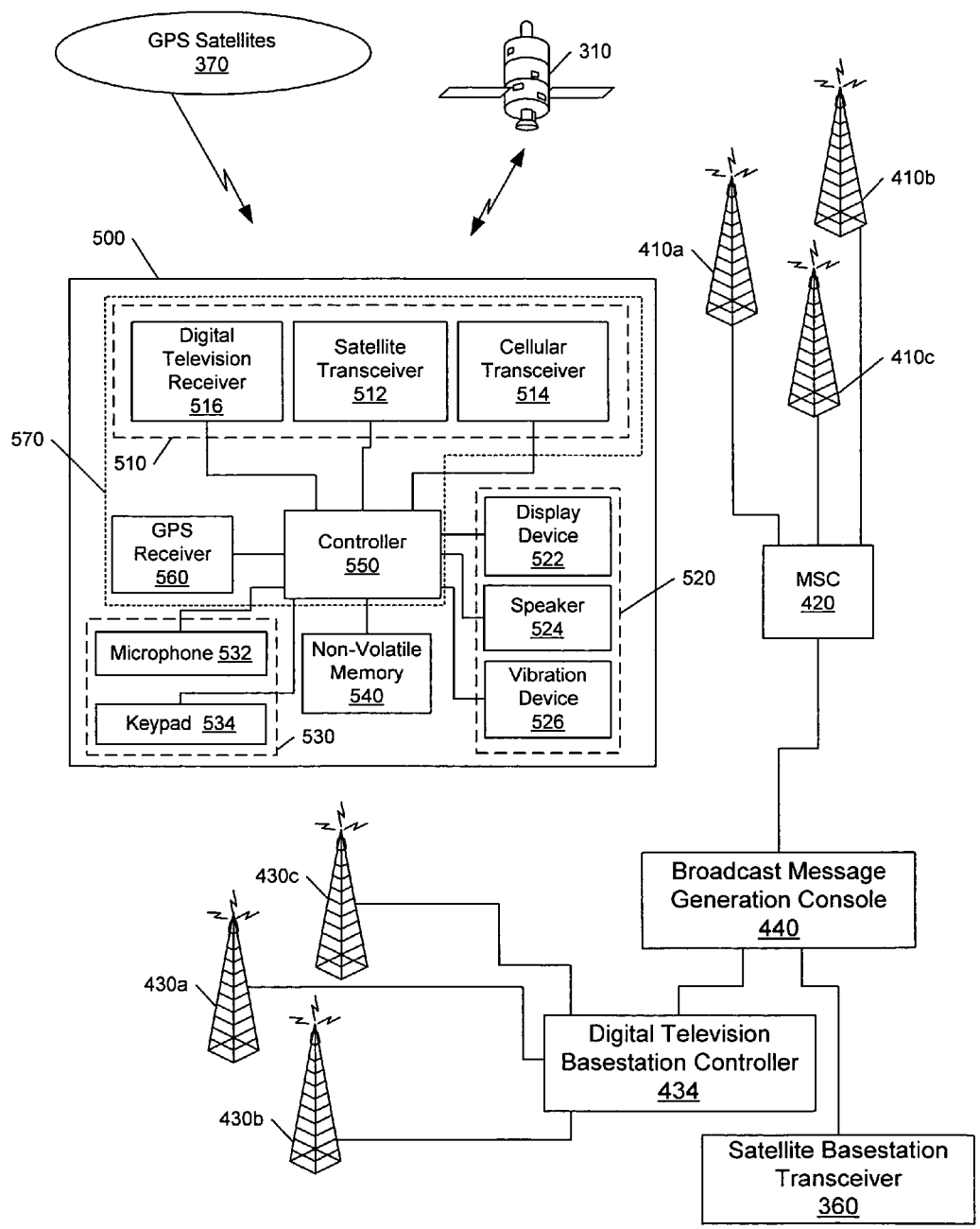
FIG. 5 is a block diagram of a radioterminal that is configured to receive a broadcast message from a satellite communications system and/or a terrestrial communications system according to some embodiments of the present invention.

FIG. 5 further illustrates a radioterminal 500 that may be used as one or more of the radioterminals 130, 140, 330, 332, 450, 452 (FIGS. 1, 3, 4) within a satellite and/or terrestrial communication system in accordance with some embodiments of the present invention. The radioterminal 500 may include a wireless transceiver 510, an output interface 520, a user input interface 530, a non-volatile memory 540, and a GPS receiver 560 that are communicatively connected to a controller 550. The user input interface 530 may include a keypad 534 and/or a microphone 532. Although the controller 550 has been illustrated as a single functional block to simplify the drawing, it is to be understood the function and operations described herein for the controller 550 may be distributed among a plurality a devices (e.g., a digital signal processor, general purpose processor, gate array, etc.).

The wireless transceiver 510 can include a satellite transceiver 512, a cellular transceiver 514, and/or a digital television transceiver 516 that are configured to receive a broadcast message, which defines a region of applicability, from the satellite 310, the cellular base station transceivers 410a-c, and the digital television base station transceivers 430a-c, respectively. The satellite, cellular, and/or digital television transceivers 512, 514, 516 may be further configured to respond back by transmitting data to provide bi-directional communications, but the present invention is not limited to such bi-directional communication transceivers. Accordingly, as used herein, a radioterminal "transceiver" may, or may not, be configured to only receive broadcast messages.

The cellular transceiver 514 may be configured to communicate with the cellular base station transceivers 410a-c using one or more cellular communications protocols including, but not limited to, Advanced Mobile Phone Service (AMPS), ANSI-136, Global Standard for Mobile (GSM) communications, General Packet Radio Service (GPRS), enhanced data rates for GSM evolution (EDGE), code division multiple access (CDMA), wideband-CDMA, cdma2000, and/or Universal Mobile Telecommunications System (UMTS).

The GPS receiver 560 is configured to determine a geographic location of the radioterminal 500 responsive to signals received from the GPS satellites 370, and to communicate the determined location to the controller 550. The controller 550 may alternatively or additionally be configured to determine the radioterminal location based on range estimates derived from cellular communications signals received from the cellular base station transceivers 410a-c and/or based on digital television signals received from the digital television base station transceivers 430a-c and based on the known geographic locations of the respective transceivers 410a-c, 430a-c. The MSC 420 may determine the location of the radioterminal 500 based on triangulation of signals transmitted by the radioterminal 500 to the cellular base station transceivers 410a-c, and it may then communicate the determined location to the radioterminal 500 where it is used by the controller 550. Accordingly, the controller 550 in combination with one or more of the transceivers 512, 514, 516 and/or the GPS receiver 560 are collectively referred to herein as a location determination unit 570.

The controller 550 is further configured to determine whether the radioterminal 500 is located in a region of applicability defined by region information in a received broadcast message, and configured to activate a functional mode of the radioterminal 500 in response to being in the region of applicability. The output interface 520 may include a display device 522, a speaker 524, and/or a vibration device 526 which are controlled by the controller 550 in response to the broadcast message and the determination of whether the radioterminal 500 is in the region of applicability.

The controller 550 may, for example, display first payload information defined by the broadcast message on the display device 522 in response to the radioterminal 500 being in the region of applicability, and can display different second payload information defined by the broadcast message in response to the radioterminal 500 not being in the region of applicability. The controller 550 may alternatively or additionally generate a first audible announcement through the speaker 524 and/or vibration having first characteristics through the vibration device 526 based on the first payload information and in response to the radioterminal 500 being in the region of applicability, and can generate a different second audible announcement and/or different second vibration characteristic based on the second payload information and in response to the radioterminal 500 not being in the region of applicability.

One or more of the satellite transceiver 512, the cellular transceiver 514, and/or the digital television transceiver 516 may be configured to at least partially decode the broadcast message to obtain the region of applicability, and to further decode the broadcast message to obtain the payload information responsive to the radioterminal 500 being determined to be in the region of applicability. For example, the region of applicability can be encoded in a header portion of the broadcast message. The transceivers 512-516 may decode the header portion of the broadcast message to obtain the region of applicability and, when the radioterminal is determined to be in the region, it may further decode payload portion of the broadcast message. When the broadcast message is received within a continuous broadcast message data stream, the transceivers 512-516 may decode portions of the data stream to obtain the defined region and, responsive to the radioterminal 500 being in the defined region, they may decode other portions of the data stream to obtain the payload information. Decoding of the data stream can cease when the radioterminal 500 is outside a last obtained region of applicability.

The controller 550 can store at least a portion of a received broadcast message in the non-volatile memory 540 responsive to the determination of whether the radioterminal 500 is in the region of applicability. For example, the controller 550 may display the payload information on the display device 522 and/or generate an audible announcement through the speaker 524 in response to the radioterminal 500 being in the region of applicability, and may store at least a portion of the payload information and the associated region of applicability in the non-volatile memory 540 when it is outside the region of applicability. When the radioterminal 500 is subsequently determined to have entered the region of applicability, the controller 500 can retrieve the stored payload information from the non-volatile memory 540 and display it on the display device 522 and/or use it to generate an audible announcement through the speaker 524.

The non-volatile memory 540 may include, but is not limited to, a magnetic disk-based storage device, a read-write optical disk-based storage device, a Electrically Eraseable Programmable Read-Only Memory (EEPROM) device, a Flash EPROM device, a battery backed Random Access Memory (RAM) device, and/or a hierarchy of two or more of these devices.

In some embodiments of the invention, a decision by the controller 550 of the radioterminal 500 of FIG. 5, may not be based on a determined position of the radioterminal. Instead, the decision may be based on a user input and/or a system input to the radioterminal. In some embodiments, the user and/or system input to the radioterminal may be data associated with a user of the radioterminal. The data associated with the user of the radioterminal may be associated with one or more preferences of the user of the radioterminal. Accordingly, the input to the radioterminal may be used by the controller 550 of the radioterminal as a "filter" to exclude first information that is received at the radioterminal by a broadcast message from being presented to the user of the radioterminal, while including second information that is received at the radioterminal by the broadcast message, that passes through the filter, to be presented to the user of the radioterminal. In some embodiments, the decision may be based on both the determined position of the radioterminal and the input to the radioterminal. Accordingly, content of a broadcast message that may be of interest to a user of a radioterminal may be displayed to the user of the radioterminal, while other content of the broadcast message that may not be of interest to the user of the radioterminal may not be displayed to the user of the radioterminal.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of operating a radioterminal, the method comprising:
   receiving at the radioterminal over a wireless air interface a broadcast message that comprises region information that defines a geographic region of applicability;
   determining by the radioterminal whether the radioterminal is located in the region of applicability;
   generating a first message from the radioterminal to a user in response to determining that the radioterminal is within the region of applicability; and
   generating a second message, which is different from the first message, from the radioterminal to the user in response to determining that the radioterminal is outside the region of applicability,
   wherein generating a first message from the radioterminal to a user in response to determining that the radioterminal is within the region of applicability comprises displaying first payload information defined by the broadcast message on a display device of the radioterminal; and
   wherein generating a second message, which is different from the first message, from the radioterminal to the user in response to determining that the radioterminal is outside the region of applicability comprises displaying second payload information defined by the broadcast message, which is different than the first payload information, on the display device of the radioterminal.

2. The method of claim 1, wherein:
   generating a first message from the radioterminal to a user in response to determining that the radioterminal is within the region of applicability further comprises generating a vibration having first characteristics to alert a user of the radioterminal; and
   generating a second message, which is different from the first message, from the radioterminal to the user in response to determining that the radioterminal is outside the region of applicability further comprises generating a vibration having second characteristics, which are different from the first characteristics, to alert a user of the radioterminal.

3. The method of claim 1, wherein determining at the radioterminal whether the radioterminal is located within the region of applicability comprises:
   determining a geographic location of the radioterminal responsive to received global positioning system signals; and
   comparing the determined geographic location of the radioterminal to the region of applicability defined by the broadcast message.

4. The method of claim 3, wherein comparing the determined geographic location of the radioterminal to the region of applicability defined by the broadcast message comprises determining whether the geographic location of the radioterminal is within a geographic boundary defined by the region of applicability.

5. The method of claim 3, wherein comparing the determined geographic location of the radioterminal to the region of applicability defined by the broadcast message comprises determining whether the geographic location of the radioterminal is within a defined radius of a geographic location defined by the region of applicability.

6. The method of claim 1, wherein determining at the radioterminal whether the radioterminal is located within the region of applicability comprises:
   determining a geographic location of the radioterminal based on range estimates derived from cellular communication signals received from and/or transmitted to a plurality of cellular base stations having known geographic locations; and
   determining at the radioterminal whether the determined geographic location of the radioterminal is located within the region of applicability.

7. The method of claim 1, wherein determining at the radioterminal whether the radioterminal is located within the region of applicability comprises:
   determining a geographic location of the radioterminal based on range estimates derived from digital television signals received at the radioterminal from a plurality of digital television base station transceivers having known geographic locations; and
   determining at the radioterminal whether the determined geographic location of the radioterminal is located within the region of applicability.

8. The method of claim 1, wherein:
   the broadcast message received at the radioterminal further comprises a group address that defines a group of radioterminals for which the broadcast message is applicable;
   determining at the radioterminal whether the radioterminal is located within the region of applicability further comprises determining at the radioterminal whether the radioterminal is a member of the group of radioterminals defined by the group address for which the broadcast message is applicable; and
   generating a first message from the radioterminal to a user comprises generating the first message from the radioterminal in response to determining that the radioterminal is within the region of applicability and is a member of the group of radioterminals for which the broadcast message is applicable.

9. The method of claim 1, wherein receiving at the radioterminal over a wireless air interface a broadcast message comprises:
   partially decoding the broadcast message to obtain the region of applicability; and further decoding the broadcast message to obtain payload information defined by the broadcast message responsive to the radioterminal being in the region of applicability.

10. The method of claim 9, wherein:
the received broadcast message comprises a header portion that defines the region of applicability and a payload portion that comprises the payload information;
partially decoding the broadcast message comprises decoding the header portion of the broadcast message to obtain the region of applicability; and
further decoding the broadcast message comprises decoding the payload portion to obtain the payload information in response to the radioterminal being in the region of applicability.

11. The method of claim 1, wherein receiving at the radioterminal over a wireless air interface a broadcast message comprises:
receiving a continuous broadcast message data stream that comprises region information that defines the region of applicability and which is encoded at multiple locations within the broadcast message data stream, and the broadcast message further comprises payload information between the region information;
decoding the region information received in the broadcast message data stream to obtain the region of applicability; and
conditionally decoding payload information received after the received region information in response to the radioterminal being in the region of applicability obtained from the decoded region information.

12. The method of claim 11, wherein:
the region information repeated within the received broadcast message data stream defines different geographic regions of applicability over time; and
receiving at the radioterminal over a wireless air interface a broadcast message further comprises ceasing decoding of the payload information in response to the radioterminal not being within a last obtained region of applicability.

13. The method of claim 11, wherein the region information repeated within the received broadcast message data stream defines different geographic regions of applicability over time, and further comprising:
ceasing generation of the first message and initiating generation of the second message in response to the radioterminal not being within a last obtained region of applicability.

14. The method of claim 1, further comprising selectively storing at least a portion of the received broadcast message in a non-volatile memory within the radioterminal responsive to the determination of whether the radioterminal is located within the region of applicability.

15. A method of operating a radioterminal, the method comprising:
receiving at the radioterminal over a wireless air interface a broadcast message that comprises region information that defines a geographic region of applicability;
determining by the radioterminal whether the radioterminal is located in the region of applicability;
generating a first message from the radioterminal to a user in response to determining that the radioterminal is within the region of applicability; and
generating a second message, which is different from the first message, from the radioterminal to the user in response to determining that the radioterminal is outside the region of applicability,
wherein generating a first message from the radioterminal to a user in response to determining that the radioterminal is within the region of applicability comprises generating a first audible announcement by the radioterminal; and
wherein generating a second message, which is different from the first message, from the radioterminal to the user in response to determining that the radioterminal is outside the region of applicability comprises generating a second audible announcement by the radioterminal which is different from the first audible announcement.

16. A method of operating a radioterminal, the method comprising:
receiving at the radioterminal over a wireless air interface a broadcast message that comprises region information that defines a geographic region of applicability;
determining by the radioterminal whether the radioterminal is located in the region of applicability;
generating a first message from the radioterminal to a user in response to determining that the radioterminal is within the region of applicability; and
generating a second message, which is different from the first message, from the radioterminal to the user in response to determining that the radioterminal is outside the region of applicability,
wherein:
receiving at the radioterminal over a wireless air interface a broadcast message comprises obtaining region information from the broadcast message that defines a plurality of different geographic regions of applicability,
determining at the radioterminal whether the radioterminal is located within the region of applicability comprises determining whether the radioterminal is within one of the plurality of different geographic regions of applicability, and
further comprising generating different ones of a plurality of different messages from the radioterminal to a user in response to the radioterminal being determined to be in different corresponding ones of the plurality of different geographic regions of applicability, by
displaying on a display device of the radioterminal different message content that is contained in the received broadcast message in response to the radioterminal being determined to be in different ones of the plurality of different geographic regions of applicability.

17. A method of operating a radioterminal, the method comprising:
receiving at the radioterminal over a wireless air interface a broadcast message that comprises region information that defines a geographic region of applicability;
determining by the radioterminal whether the radioterminal is located in the region of applicability;
generating a first message from the radioterminal to a user in response to determining that the radioterminal is within the region of applicability; and
generating a second message, which is different from the first message, from the radioterminal to the user in response to determining that the radioterminal is outside the region of applicability,
wherein:
receiving at the radioterminal over a wireless air interface a broadcast message comprises obtaining region information from the broadcast message that defines a plurality of different geographic regions of applicability,
determining at the radioterminal whether the radioterminal is located within the region of applicability comprises determining whether the radioterminal is within one of the plurality of different geographic regions of applicability, and further comprising generating different ones of a plurality of different messages from the radioterminal to a user in response to the radioterminal being determined to be in different corresponding ones of the plurality of different geographic regions of applicability, by generating different audible announcements by the radioterminal that is contained in the received broadcast message in response to the radioterminal being determined to be in different ones of the plurality of different geographic regions of applicability.

18. A method of operating a radioterminal, the method comprising:

receiving at the radioterminal over a wireless air interface a broadcast message that comprises region information that defines a geographic region of applicability and further comprises payload information;

determining by the radioterminal whether the radioterminal is located in the region of applicability;

generating a first message from the radioterminal to a user in response to determining that the radioterminal is within the region of applicability;

generating a second message, which is different from the first message, from the radioterminal to the user in response to determining that the radioterminal is outside the region of applicability;

displaying the payload information on a display device of the radioterminal in response to the radioterminal being in the region of applicability;

storing at least a portion of the payload information and associated region of applicability in a non-volatile memory within the radioterminal and not displaying the payload information in response to the radioterminal being outside the region of applicability;

retrieving the stored payload information from the non-volatile memory in response to the radioterminal becoming within the region of applicability; and displaying the retrieved payload information on the display device.

19. A method of operating a radioterminal, the method comprising:

receiving at the radioterminal over a wireless air interface a broadcast message that comprises region information that defines a geographic region of applicability and further comprises payload information;

determining by the radioterminal whether the radioterminal is located in the region of applicability;

generating a first message from the radioterminal to a user in response to determining that the radioterminal is within the region of applicability;

generating a second message, which is different from the first message, from the radioterminal to the user in response to determining that the radioterminal is outside the region of applicability;

generating an audible announcement from the radioterminal based on the payload information and in response to the radioterminal being in the region of applicability;

storing at least a portion of the payload information and associated region of applicability in a non-volatile memory within the radioterminal and not generating an audible announcement based on the payload information in response to the radioterminal being outside the region of applicability;

retrieving the stored payload information from the non-volatile memory in response to the radioterminal becoming within the region of applicability; and generating an audible announcement from the radioterminal based on the retrieved payload information.

20. A radioterminal comprising:

a user interface that is configured to communicate information to a user of the radioterminal;

a wireless transceiver that is configured to receive over a wireless air interface a broadcast message that comprises region information that defines a geographic region of applicability;

a location determination unit that is configured to determine a geographic location of the radioterminal; and a controller that is configured to determine whether the radioterminal is located in the region of applicability based on the region information from the broadcast message and the determined location of the radioterminal, and to generate a first message to a user in response to determining that the radioterminal is within the region of applicability, and to generate a second message, which is different from the first message, to the user in response to determining that the radioterminal is outside the region of applicability, wherein the user interface comprises a display device, and the controller is further configured to display first payload information defined by the broadcast message on the display device in response to determining that the radioterminal is in the region of applicability, and to display second payload information defined by the broadcast message, which is different than the first payload information, on the display device in response to determining that the radioterminal is outside the region of applicability.

21. The radioterminal of claim 20, wherein the user interface comprises a speaker, and the controller is further configured to generate a first audible announcement through the speaker based on the broadcast message and in response to determining that the radioterminal is in the region of applicability, and to generate a second audible announcement, which is different from the first audible announcement, through the speaker based on the broadcast message and in response to determining that the radioterminal is outside the region of applicability.

22. The radioterminal of claim 20, wherein the user interface comprises a vibration device, and the controller is further configured to generate a vibration having first characteristics through the vibration device to alert a user of the radioterminal in response to determining that the radioterminal is in the region of applicability, and to generate a vibration having second characteristics, which are different than the first characteristics, through the vibration device in response to determining that the radioterminal is outside the region of applicability.

23. The radioterminal of claim 20, wherein:

the broadcast message received by the wireless transceiver comprises region information that defines a plurality of different geographic regions of applicability; and the controller is further configured to generate different ones of a plurality of different messages from the radioterminal to a user in response to the radioterminal being determined to be in different corresponding ones of the plurality of different geographic regions of applicability.

24. The radioterminal of claim 20, wherein:
the controller is further configured to determine whether the determined geographic location of the radioterminal is within a geographic boundary defined by the region of applicability.

25. The radioterminal of claim 20, wherein:
the controller is further configured to determine whether the determined geographic location of the radioterminal is within a defined radius of a geographic location defined by the region of applicability.

26. The radioterminal of claim 20, wherein:
the location determination unit comprises a global positioning system (GPS) receiver that is configured to determine the geographic location of the radioterminal responsive to GPS signals received by the GPS receiver; and
the controller is further configured to compare the determined geographic location of the radioterminal to the region of applicability defined by the broadcast message.

27. The radioterminal of claim 20, wherein:
the wireless transceiver comprises a cellular transceiver that is configured to communicate with cellular base station transceivers;
the location determination unit is configured to determine the geographic location of the radioterminal based on range estimates derived from cellular communication signals received from and/or transmitted to a plurality of cellular base stations having known geographic locations; and
the controller is further configured to determine whether the determined geographic location of the radioterminal is located within the region of applicability.

28. The radioterminal of claim 20, wherein:
the wireless transceiver comprises a digital television transceiver that is configured to receive digital television signals from digital television base station transceivers;
the location determination unit is configured to determine the geographic location of the radioterminal based on range estimates derived from digital television signals received from a plurality of the digital television base station transceivers having known geographic locations; and
the controller is further configured to determine whether the determined geographic location of the radioterminal is located within the region of applicability.

29. The radioterminal of claim 20, wherein the received broadcast message further comprises a group address that defines a group of radioterminals for which the broadcast message is applicable, and the controller is further configured to determine whether the radioterminal is a member of the group of radioterminals defined by the group address for which the broadcast message is applicable and to generate the first message in response to determining that the radioterminal is within the region of applicability and is a member of the group of radioterminals for which the broadcast message is applicable.

30. The radioterminal of claim 20, wherein the wireless transceiver is further configured to partially decode the broadcast message to obtain the region of applicability, and to conditionally further decode the broadcast message to obtain payload information defined by the broadcast message responsive to the radioterminal being in the region of applicability.

31. The radioterminal of claim 30, wherein the received broadcast message comprises a header portion that defines the region of applicability and a payload portion that comprises the payload information, and the wireless transceiver is further configured to partially decode the header portion of the broadcast message to obtain the region of applicability and to conditionally further decode the payload portion to obtain the payload information in response to the radioterminal being in the region of applicability.

32. A radioterminal comprising:
a user interface that is configured to communicate information to a user of the radioterminal;
a wireless transceiver that is configured to receive over a wireless air interface a broadcast message that comprises region information that defines a geographic region of applicability;
a location determination unit that is configured to determine a geographic location of the radioterminal;
a controller that is configured to determine whether the radioterminal is located in the region of applicability based on the region information from the broadcast message and the determined location of the radioterminal, and to generate a first message to a user in response to determining that the radioterminal is within the region of applicability, and to generate a second message, which is different from the first message, to the user in response to determining that the radioterminal is outside the region of applicability; and
a non-volatile memory, the controller is further configured to conditionally store at least a portion of the received broadcast message in the non-volatile memory responsive to the determination of whether the radioterminal is located within the region of applicability;
a display device,
wherein:
the received broadcast message further comprises payload information;
the controller is further configured to display the payload information on the display device in response to the radioterminal being in the region of applicability, and to store at least a portion of the payload information and associated region of applicability in the non-volatile memory without displaying the payload information in response to the radioterminal being outside the region of applicability; and
the controller is further configured to retrieve the stored payload information from the non-volatile memory in response to the radioterminal becoming within the region of applicability, and to display the retrieved payload information on the display device.

33. A radioterminal comprising:
a user interface that is configured to communicate information to a user of the radioterminal;
a wireless transceiver that is configured to receive over a wireless air interface a broadcast message that comprises region information that defines a geographic region of applicability;
a location determination unit that is configured to determine a geographic location of the radioterminal;
a controller that is configured to determine whether the radioterminal is located in the region of applicability based on the region information from the broadcast message and the determined location of the radioterminal, and to generate a first message to a user in response to determining that the radioterminal is within the region of applicability, and to generate a second message, which is different from the first message, to the user in response to determining that the radioterminal is outside the region of applicability;

a speaker, wherein:

the received broadcast message further comprises payload information;

the controller is further configured to generate an audible announcement through the speaker based on the payload information and in response to the radioterminal being in the region of applicability, and to store at least a portion of the payload information and associated region of applicability in the non-volatile memory without generating the audible announcement in response to the radioterminal being outside the region of applicability; and the controller is further configured to retrieve the stored payload information from the non-volatile memory in response to the radioterminal becoming within the region of applicability and to generate the audible announcement through the speaker based on the retrieved payload information.

* * * * *